(12) United States Patent
Aist et al.

(10) Patent No.: US 11,092,458 B2
(45) Date of Patent: Aug. 17, 2021

(54) NAVIGATION SYSTEM WITH OPERATION OBSTACLE ALERT MECHANISM AND METHOD OF OPERATION THEREOF

(71) Applicant: Telenav, Inc., Santa Clara, CA (US)

(72) Inventors: Gregory Stewart Aist, Santa Clara, CA (US); Casey Thomas Carter, Sunnyvale, CA (US); Shalu Grover, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 53 days.

(21) Appl. No.: 16/175,694

(22) Filed: Oct. 30, 2018

(65) Prior Publication Data

US 2020/0132503 A1 Apr. 30, 2020

(51) Int. Cl.
*G01C 21/36* (2006.01)
*G01C 21/34* (2006.01)
*G05D 1/00* (2006.01)

(52) U.S. Cl.
CPC ..... *G01C 21/3691* (2013.01); *G01C 21/3415* (2013.01); *G05D 1/0088* (2013.01)

(58) Field of Classification Search
CPC ............ G01C 21/3691; G01C 21/3415; G05D 1/0088
USPC .......................................................... 701/538
See application file for complete search history.

(56) References Cited

U.S. PATENT DOCUMENTS

| | | | |
|---|---|---|---|
| 9,235,211 B2 | 1/2016 | Davidsson et al. | |
| 9,428,183 B2 | 8/2016 | Foley | |
| 9,487,139 B1 * | 11/2016 | Ishida | B60W 30/08 |
| 9,727,056 B2 | 8/2017 | Laur et al. | |
| 10,001,780 B2 * | 6/2018 | Gabardos | G05D 1/0274 |
| 10,040,450 B1 * | 8/2018 | Pal | G05D 1/0088 |
| 10,558,224 B1 * | 2/2020 | Lin | G08G 1/165 |
| 10,710,592 B2 * | 7/2020 | Lin | G01S 17/931 |
| 2002/0059026 A1 * | 5/2002 | Abe | G01C 21/26 |
| | | | 701/301 |

(Continued)

FOREIGN PATENT DOCUMENTS

| | | | |
|---|---|---|---|
| CN | 106970619 A | * | 7/2017 |
| CN | 107797559 A | * | 3/2018 |

(Continued)

OTHER PUBLICATIONS

Zhang et al., "A Method for the Shortest Distance Routing in a Chart Based on Testing a Spatial Relation of a Route Segment and an Obstacle Area," 2010, vol. 5, Publisher: IEEE.*

(Continued)

*Primary Examiner* — Tuan C To
(74) *Attorney, Agent, or Firm* — Perspectives Law Group, Corp.

(57) ABSTRACT

A navigation system includes: a control unit configured to: identify a route obstacle in a travel environment of a user vehicle during operation of the user vehicle in an autonomous operation mode; generate an obstacle handling assessment of whether the user vehicle is capable of navigation beyond the route obstacle in the autonomous operation mode; generate an obstacle orientation alert based on the obstacle handling assessment and an engagement state of a system user of the user vehicle; a user interface, coupled to the control unit, configured to present the obstacle orientation alert.

20 Claims, 5 Drawing Sheets

(56) References Cited

U.S. PATENT DOCUMENTS

| | | | | |
|---|---|---|---|---|
| 2007/0219720 | A1* | 9/2007 | Trepagnier | G05D 1/0278 701/300 |
| 2010/0106356 | A1* | 4/2010 | Trepagnier | G08G 1/16 701/25 |
| 2013/0190964 | A1* | 7/2013 | Uehara | G01C 21/3691 701/25 |
| 2015/0070160 | A1* | 3/2015 | Davidsson | G05D 1/0061 340/457 |
| 2015/0185027 | A1* | 7/2015 | Kikkeri | G01C 25/00 701/533 |
| 2015/0306761 | A1* | 10/2015 | O'Connor | G05D 1/0221 700/250 |
| 2016/0031441 | A1 | 2/2016 | Foley | |
| 2016/0125746 | A1* | 5/2016 | Kunzi | G01S 15/87 701/11 |
| 2016/0185387 | A1* | 6/2016 | Kuoch | B60K 35/00 701/41 |
| 2016/0378114 | A1 | 12/2016 | Laur et al. | |
| 2017/0008518 | A1* | 1/2017 | Arndt | B62D 15/0265 |
| 2017/0043768 | A1* | 2/2017 | Prokhorov | B60W 30/0953 |
| 2017/0240183 | A1* | 8/2017 | Suzuki | G05D 1/0088 |
| 2017/0329347 | A1* | 11/2017 | Passot | G05D 1/0088 |
| 2018/0088574 | A1* | 3/2018 | Latotzki | G05D 1/0251 |
| 2018/0120839 | A1* | 5/2018 | Hasberg | B60W 50/029 |
| 2018/0233047 | A1* | 8/2018 | Mandeville-Clarke | B62D 15/0255 |
| 2018/0326994 | A1* | 11/2018 | Sakai | B60W 40/08 |
| 2019/0317512 | A1* | 10/2019 | Zhang | B60W 60/0013 |
| 2019/0322291 | A1* | 10/2019 | Tsuda | G05D 1/0088 |
| 2020/0004243 | A1* | 1/2020 | Wiesenberg | G05D 1/021 |
| 2020/0070848 | A1* | 3/2020 | Ozer | B60W 40/02 |
| 2020/0118446 | A1* | 4/2020 | Saunders | G01C 21/20 |
| 2020/0125093 | A1* | 4/2020 | Sham | G06K 9/3241 |

FOREIGN PATENT DOCUMENTS

| | | | | |
|---|---|---|---|---|
| CN | 107862889 | A * | 3/2018 | |
| CN | 108001445 | A * | 5/2018 | |
| EP | 3109115 | A1 * | 12/2016 | B60W 50/0097 |
| EP | 3231682 | A1 * | 10/2017 | G05D 1/0061 |
| JP | 2017123065 | A * | 7/2017 | |
| JP | 2017221222 | A * | 12/2017 | |
| WO | WO-2017144350 | A1 * | 8/2017 | G05D 1/0274 |
| WO | WO-2018104217 | A1 * | 6/2018 | H04W 36/36 |

OTHER PUBLICATIONS

Zhude et al., "An Algorithm for Shortest Raster Distance in Euclidean Space with Obstacles," 2011, Publisher: IEEE.*

Angelo et al., "Obstacle Detection using a 2D LIDAR System for an Autonomous Vehicle," 2016, Publisher: IEEE.*

Yen-Sheng et al., "Application of Intelligent Computing to Autonomous Vehicle Control," 2010, Publisher: IEEE.*

Huichao et al., "Obstacle Avoidance Strategy of AGV Formation based on Time Efficiency First," 2017, Publisher: IEEE.*

Marcel Walch et al. "Autonomous Driving: Investigating the Feasibility of Car-Driver Handover Assistance" (published in:) AutomotiveUI '15 Proceedings of the 7th International Conference on Automotive User Interfaces and Interactive Vehicular Applications, pp. 11-18, Sep. 1, 2015.

Yujia Cao et al. "On Timing and Modality Choice with Local Danger Warnings for Drivers" (published in:) AutomotiveUI 09 Proceedings of the 1st International Conference on Automotive User Interfaces and Interactive Vehicular Applications, pp. 75-78, Sep. 21, 2009.

Neal E. Boudette "5 Things That Give Self-Driving Cars Headaches" (published in:) New York Times at "https://www.nytimes.com/interactive/2016/06/06/automobiles/autonomous-cars-problems.html", Jun. 4, 2016.

* cited by examiner

FIG. 5

NAVIGATION SYSTEM WITH OPERATION OBSTACLE ALERT MECHANISM AND METHOD OF OPERATION THEREOF

TECHNICAL FIELD

An embodiment of the present invention relates generally to a navigation system, and more particularly to a system for obstacle alerts.

BACKGROUND

Modern consumer and industrial electronics, especially devices such as graphical navigation systems, cellular phones, vehicle integrated navigation and computing systems, guided navigation system, autonomous functions for vehicles, and self-driving cars, are providing increasing levels of functionality to support modern life including navigation and route guidance services. Research and development in the existing technologies can take a myriad of different directions.

As users become more empowered with the growth of navigation devices, vehicle based navigation services, and vehicle automation, new and old paradigms begin to take advantage of this new device space. There are many technological solutions to take advantage of this new device capability for autonomous operation of a vehicle. However, the state of the users is often not taken into account when changing between autonomous and manual control of a vehicle.

Thus, a need still remains for a navigation system with an obstacle alert mechanism for operator awareness while using a navigation system. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a control unit configured to: identify a route obstacle in a travel environment of a user vehicle during operation of the user vehicle in an autonomous operation mode; generate an obstacle handling assessment of whether the user vehicle is capable of navigation beyond the route obstacle in the autonomous operation mode; generate an obstacle orientation alert based on the obstacle handling assessment and an engagement state of a system user of the user vehicle; a user interface, coupled to the control unit, configured to present the obstacle orientation alert.

An embodiment of the present invention provides a method of operation of a navigation system including: identifying a route obstacle in a travel environment of a user vehicle during operation of the user vehicle in an autonomous operation mode; generating an obstacle handling assessment of whether the user vehicle is capable of navigation beyond the route obstacle in the autonomous operation mode; and generating an obstacle orientation alert based on the obstacle handling assessment and an engagement state of a system user of the user vehicle.

An embodiment of the present invention provides a non-transitory computer readable medium including instructions executable by a control circuit for a navigation system, the instructions including: identifying a route obstacle in a travel environment of a user vehicle during operation of the user vehicle in an autonomous operation mode; generating an obstacle handling assessment of whether the user vehicle is capable of navigation beyond the route obstacle in the autonomous operation mode; and generating an obstacle orientation alert based on the obstacle handling assessment and an engagement state of a system user of the user vehicle.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Figure 1:
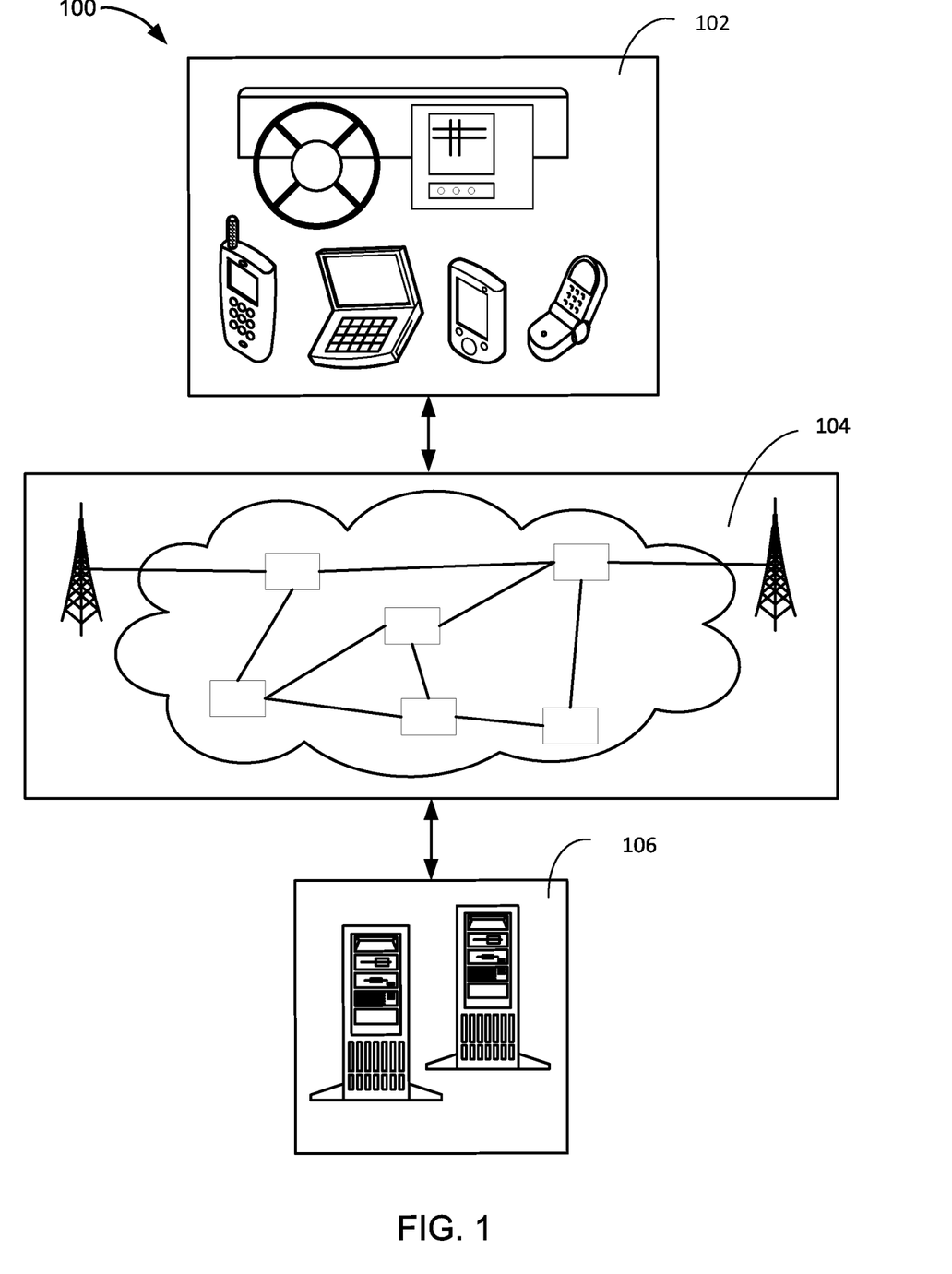
FIG. 1 is a navigation system with obstacle alert mechanism in an embodiment of the present invention.

Referring now to FIG. 1, therein is shown a navigation system 100 with route prediction mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of computing devices, such as a cellular phone, a tablet computer, a smart phone, a notebook computer, vehicle embedded navigation system or computing device. The first device 102 can couple, either directly or indirectly, to the communication path 104 to communicate with the second device 106 or can be a stand-alone device.

The second device 106 can be any of a variety of centralized or decentralized computing devices, or sensor instrument or devices to take measurements or record environmental information. For example, the second device 106 can be a multimedia computer, a laptop computer, a desktop computer, a video game console, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
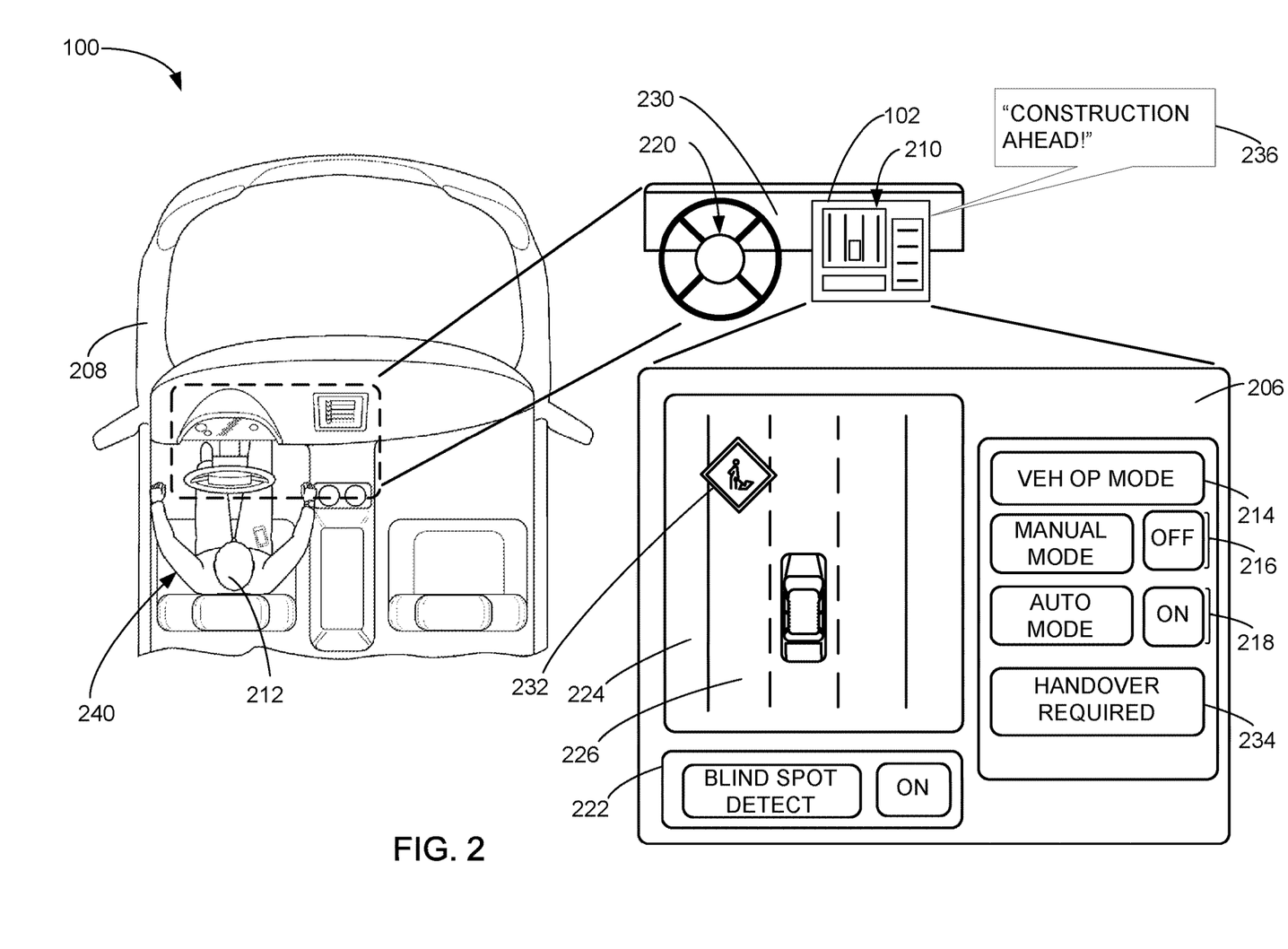
FIG. 2 is an example of a display interface of the first device of FIG. 1.

Referring now to FIG. 2, therein is shown an example of a system interface 210 of the first device 102 of FIG. 1. The system interface 210 can be a physical device. For example, the system interface 210 can be integrated with a user vehicle 208 as an attached or embedded vehicle interface, such as a dashboard or center console interface of the user vehicle 208. As another example, the system interface 210 can be a standalone device separate or detached from the user vehicle 208, such as a mobile device, a navigation device, mobile phone, or mobile computing device. In an implementation of the first device 102 that is integrated with the user vehicle 208, the system interface 210 can include a display interface 206, such as an instrument panel with a touch screen, keypad, other interface components, or a combination thereof.

The system interface 210 can provide an interface for a system user 212 to control vehicle operation modes 214 for operating the user vehicle 208, which are different modes for operating the user vehicle 208. For example, the vehicle operation modes 214 can determine the entity that drives the user vehicle 208. As a specific example, the vehicle operation modes 214 can include the option for a manual operation mode 216 for operation of the user vehicle 208 by the system user 212 or one or more autonomous operation modes 218 for operation of the user vehicle 208.

The system user 212 is an individual capable of operating the user vehicle 208 in the manual operation mode 216. More specifically, the system user 212 can be an occupant of the vehicle or an individual that can remotely operate the user vehicle 208. As an example, the manual operation mode 216 can include control of essential vehicle control functions 220 of the user vehicle 208, non-essential vehicle functions 222 of the user vehicle 208, or a combination thereof by the system user 212.

The essential vehicle control functions 220 are functions for driving the user vehicle 208. For example, the essential vehicle control functions 220 can include braking control functions, steering control functions, throttling control functions, or a combination thereof.

The non-essential vehicle functions 222 are functions related to or ancillary to driving of the user vehicle 208. More specifically, the non-essential vehicle functions 222 can be functions or systems that do not control the essential vehicle control functions of user vehicle 208. For example, the non-essential vehicle functions 222 can be supplemental safety systems or convenience systems. Examples supplemental safety systems can include collision warning, lane departure warning, blind spot monitoring. Examples of convenience systems can include automated controls for wipers, headlights, turn signals, or hazard lights.

In instance of the vehicle operation modes 214 of the manual operation mode 216, the system user 212 of the user vehicle 208 is in sole control of the essential vehicle control functions 220 and is responsible for monitoring a travel environment 224 around the user vehicle 208 for safe and legal operation of the user vehicle 208. Autonomous operation of the non-essential vehicle functions 222 can be included in the manual operation mode 216.

The travel environment 224 is a physical area that includes the objects around the user vehicle 208. For example, the travel environment 224 can include the terrain, other vehicles, pedestrians, animals, buildings, or other objects around the user vehicle 208. The travel environment 224 can include a travel path 226, which is the path or road that the user vehicle 208 is currently travelling on.

Control of the user vehicle 208 in the autonomous operation modes 218 can be performed by an autonomous vehicle operation system 230. The autonomous vehicle operation system 230 is a system that performs various functions and operations for autonomous control and operation of the user vehicle 208. For example, the autonomous vehicle operation system 230 can perform functions for autonomous driving of the user vehicle 208 and other related operations. As a specific example, the autonomous vehicle operation system 230 can operate the user vehicle 208 through control and operation of the essential vehicle control functions 220, the non-essential vehicle functions 222, or a combination thereof. The autonomous operation modes 218 and the autonomous vehicle operation system 230 will be discussed in detail below.

During operation of the user vehicle 208, the navigation system 100, the autonomous vehicle operation system 230, or a combination thereof can detect route obstacles 232 in the travel environment 224. The route obstacles 232 are conditions or situations that are appear or occur during travel through the travel environment 224. More specifically, the route obstacles 232 can be conditions or situations in the travel environment 224 that can affect operation of the user vehicle 208, particularly during the autonomous operation of the user vehicle 208, while traveling along the travel path 226. Specific examples of the route obstacles 232 can include situations, such as the presence of a vehicle operated by a reckless or intoxicated driver; a vehicle accident or construction zone; the presence of children playing in a residential area, park, or school; pedestrians arriving or leaving a sporting or entertainment event; or weather patterns, such as rain or fog. Detection of the route obstacles 232 will be discussed in detail below.

The navigation system 100, the autonomous vehicle operation system 230, can evaluate the route obstacles 232 during the operation of the user vehicle 208, including during the autonomous operation modes 218, to generate an obstacle handling assessment 234. The obstacle handling assessment 234 is a determination of whether the autonomous vehicle operation system 230 is capable of navigating the user vehicle 208 beyond the route obstacle 232. In general, the obstacle handling assessment 234 can determine whether the autonomous vehicle operation system 230 can navigate beyond the route obstacle 232 or whether the autonomous vehicle operation system 230 must relinquish controls of one or more of the essential vehicle control functions 220 to the system user 212. Details on determining the obstacle handling assessment 234 will be discussed below.

The navigation system 100 can generate an obstacle orientation alert 236 based on the obstacle handling assessment 234. The obstacle orientation alert 236 is an alert or notification to the system user 212 regarding the route obstacle 232. More specifically, the obstacle orientation alert 236 can provide details regarding the route obstacle 232, such as whether there will be a change to another one of the vehicle operation modes 214, the type or nature of the route obstacle 232, the relative location of the route obstacle 232, the distance or time to reach the route obstacle 232, other details that can assist in informing the system user 212 about the route obstacle 232, or a combination thereof.

In general, for the obstacle handling assessment 234 indicating that no changes to the autonomous operation of the user vehicle is necessary to navigate beyond the route obstacle 232, the navigation system 100 can minimize the information provided by the obstacle orientation alert 236 or forego generating the obstacle orientation alert 236 completely. However, when the obstacle handling assessment 234 indicates that autonomous vehicle operation system 230 must change the current instance of the vehicle operation modes 214 to the manual operation mode 216 or if there is a possibility of a change to the manual operation mode 216, the navigation system 100 can generate the obstacle orientation alert 236 based on an engagement state 240 of the system user 212.

The engagement state 240 is an estimation of awareness of the system user 212 regarding the operation of the user vehicle 208, the travel path 226 of the user vehicle 208, the travel environment 224, or a combination thereof. For example the engagement state 240 can be an estimation of whether the system user 212 is ready for immediate assumption of the manual operation mode 216 of the user vehicle, whether the system user 212 is distracted, or disengaged from operation of the user vehicle 208 and the travel environment 224.

Based on the engagement state 240 of the system user 212, the navigation system 100 can determine properties of the obstacle orientation alert 236, such as timing, mode of presentation, level of detail, or other factors to assist in orienting the system user 212 to the route obstacle 232. For example, the obstacle orientation alert 236 can provide more information about the route obstacle 232 for the engagement state 240 indicating that the system user 212 is disengaged from operation of the user vehicle 208 compared to when the engagement state 240 indicates that the system user 212 is actively monitoring the travel environment 224. Details on determining the engagement state 240 of the system user 212 and generating the obstacle orientation alert 236 will be discussed below.

Figure 3:
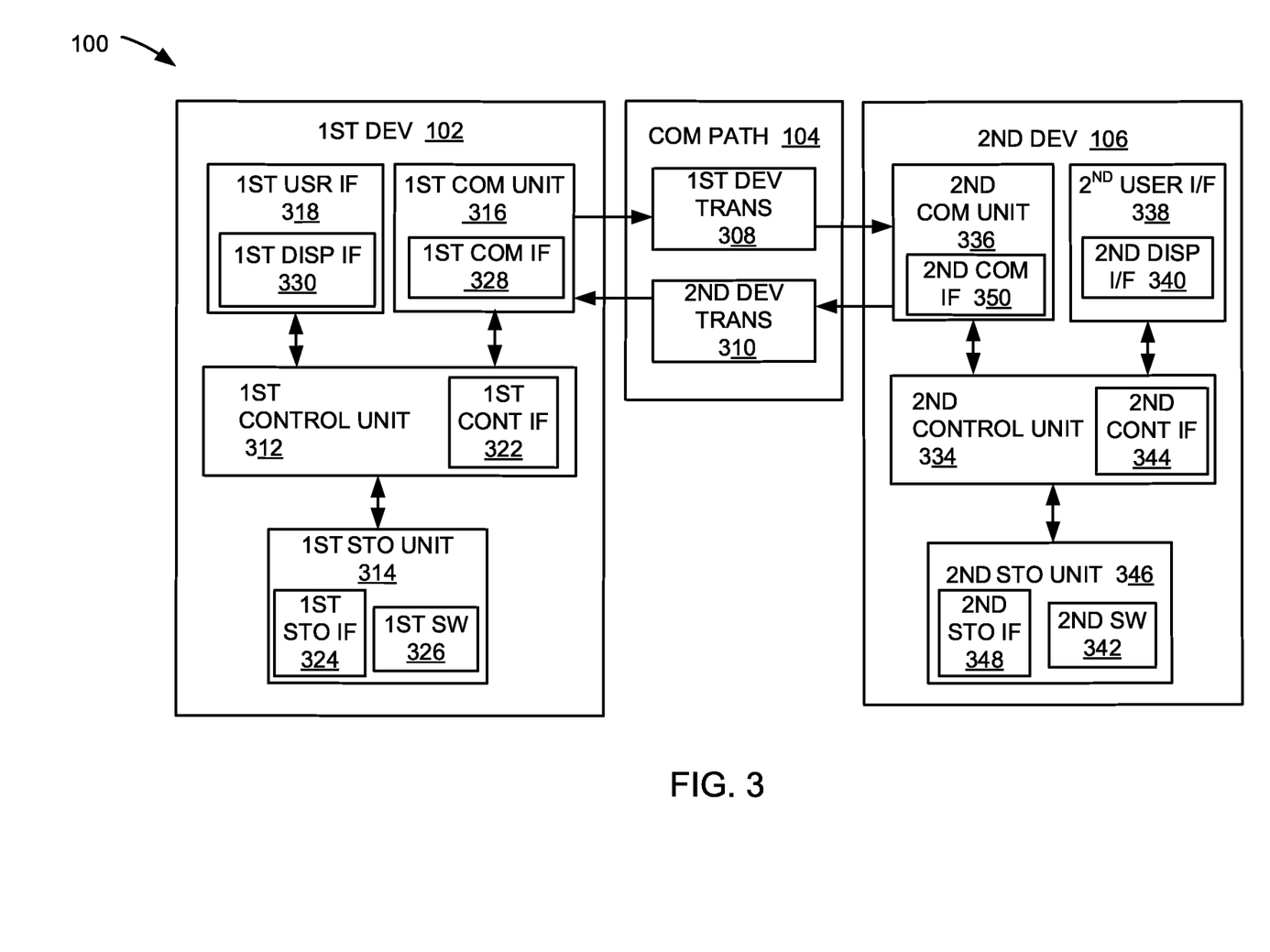
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information. For example, first storage unit 314 information for generating a navigation map.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, a camera for capturing motion or gesture inputs, or any combination thereof to provide data and communication inputs. Examples of the output device display components, haptic feedback components, audio components such as a speaker, or a combination thereof.

The first user interface 318 can include a first display interface 330. The first display interface 330 can include a display, a projector, a video screen, or any combination thereof.

The first control unit 312 can operate the first user interface 318 to display information generated by the navigation system 100. The first control unit 312 can also execute the first software 326 for the other functions of the navigation system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, a camera for capturing motion or gesture inputs, or any combination thereof to provide data and communication inputs. Examples of the output device of the second user interface 338 can include a second display interface 340, haptic feedback components, audio components such as a speaker, or a combination thereof. The second display interface 340 can include a display, a projector, a video screen, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information for generating the navigation map 240 of FIG. 2. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
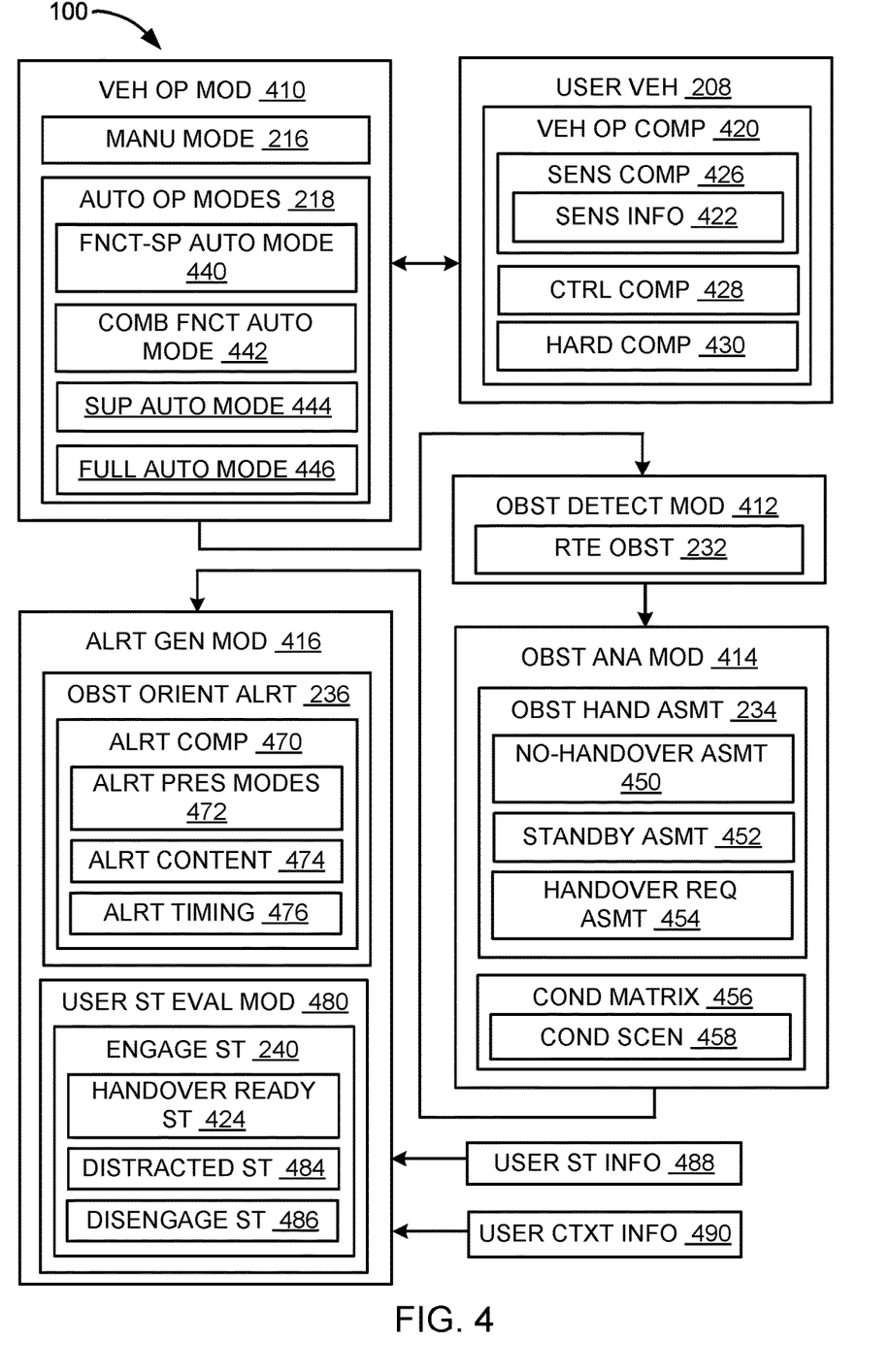
FIG. 4 is a control flow of the navigation system.

Referring now to FIG. 4, therein is shown a control flow of the navigation system 100. The navigation system 100 can include a vehicle operation module 410, an obstacle detection module 412, an obstacle analysis module 414, and an alert generation module 416. The obstacle detection module 412 can be coupled to the vehicle operation module 410. The obstacle analysis module 414 can be coupled to the obstacle detection module 412. The alert generation module 416 can be coupled to the obstacle analysis module 414.

The vehicle operation module 410 is for operation of the user vehicle 208. For example, the vehicle operation module 410 can be for operating the user vehicle 208 in the manual operation mode 216, autonomous operation modes 218, or a combination thereof. As specific example, the vehicle operation module 410 can interface with the autonomous vehicle operation system 230 of FIG. 2 for autonomous operation of the user vehicle 208. The vehicle operation module 410 can enable operation of the user vehicle 208 through control of vehicle operation components 420.

The vehicle operation components 420 are components or systems for operating the user vehicle 208, such as vehicle operations in the autonomous operation modes 218. For example, the vehicle operation components 420 can control and perform the essential vehicle control functions 220 of FIG. 2, the non-essential vehicle functions 222 of FIG. 2, or a combination thereof. The vehicle operation components 420 can include sensor components 426, control components 428, hardware components 430, or a combination thereof.

The sensor components 426 are sensors or instruments to detect, record, observe, or a combination thereof the environmental conditions surrounding the user vehicle 208. For example, the sensor components 426 can include various sensors operable to identify a condition associated with and around the user vehicle 208, such as the travel environment 224. The sensor components 426 can include sensors such as imagery sensors, RADAR, SONAR, LIDAR, sound capture devices, microphones, or a combination thereof. The vehicle operation module 410 can receive sensor information 422 from the sensor components 426. The sensor information 422 can be information recorded or measured by sensors or instruments, such as the sensor components 426, about the travel environment 224 of FIG. 2 of the user vehicle 208.

The control components 428 are components for processing input and generating output for operating the autonomous functions of the user vehicle 208. For example, the control components 428 can process information from the sensor components 426 and provide instructions to the hardware components 430 to control the essential vehicle control functions 220, the non-essential vehicle functions 222, or a combination thereof. The control components 428 can include a combination of hardware, such as the first control unit 316 of FIG. 3, the first storage unit 314 of FIG. 3, the first communication unit 316 of FIG. 3, and software, such as the first software of FIG. 3, which can include control algorithms for processing information from the sensor components 426 and generating the instructions.

The hardware components 430 are the physical devices or components for controlling the mechanisms in the user vehicle 208. For example, the hardware components 430 can include wiring, circuitry or other connections, actuators, mechanical components, or a combination thereof for controlling steering, braking, throttling, or a combination thereof for the user vehicle 208.

The vehicle operation module 410 can provide or include modes for autonomous operation of the user vehicle 208. The vehicle operation modes 214 can include multiple types of the autonomous operation modes 218. As an example, the autonomous operation modes 218 can provide varying degrees of autonomous control over the user vehicle 208. More specifically, the autonomous operation modes 218 can provide control or operation of the essential vehicle control functions 220, the non-essential vehicle functions 222, or a combination thereof to engage in various degrees of autonomous operation of the user vehicle 208. As a specific example, the autonomous operation modes 218 can include a function-specific autonomous mode 440, a combined function autonomous mode 442, a supervised autonomous mode 444, a fully autonomous mode 446, or a combination thereof.

The instance of the autonomous operation modes 218 of the function-specific autonomous mode 440 can provide autonomous control over one or more of the essential vehicle control functions 220 of the user vehicle 208 that can operate independently from one another. In general, in the function-specific autonomous mode 440, the system user 212 of the user vehicle 208 maintains overall control of the user vehicle 208, and is solely responsible for safe operation, but can choose to cede limited authority over specific or individual instances of the essential vehicle control functions 220, such as adaptive cruise control.

The function-specific autonomous mode 440 can provide automation of functions to assist the system user 212 for operating the user vehicle 208, such as providing added control in certain driving or crash-imminent situations with dynamic brake support in emergencies. However, there is no combination of the essential vehicle control functions 220 that operate in unison to enable the system user 212 to disengage from physically operating the user vehicle 208, such as removing hands from the steering wheel and feet off the pedals at the same time. Examples of function-specific autonomous state 224 can include cruise control, automatic braking, and lane keeping assist.

The combined function autonomous mode 442 can provide "Combined Function Automation." More specifically, the combined function autonomous mode 442 can provide automation of at least two of the essential vehicle control functions 220 working in unison to relieve the system user 212 of control of those functions. In general, under the combined function autonomous mode 442, the system user 212 of the user vehicle 208 is responsible for monitoring the roadway for safe operation and is expected to be available for control at all times and on short notice. For example, the combined function autonomous mode 442 can enable shared authority, which allows the system user to active control of the essential vehicle control functions 220 in certain limited driving situations. As a specific example, in the combined function autonomous mode 442, the system user 212 can disengaged from physically operating the essential vehicle control functions 220, such as hands off the steering wheel and feet off the pedals at the same time.

The supervised autonomous mode 444 can provide "Limited Self-Driving Automation." In general, in the supervised autonomous mode 444, the system user 212 is not expected to constantly monitor the roadway. More specifically, the supervised autonomous mode 444 can enable the system user 212 to cede full control of all safety-critical functions under certain traffic or environmental conditions and, in those conditions, to rely heavily on the autonomous vehicle operation system 230 to monitor for changes in those conditions that would require transition back to manual control.

The supervised autonomous mode 444 is designed to ensure safe operation of the user vehicle 208 during the automated driving and the system user 212 is expected to be available for occasional control of the user vehicle 208. An example of the supervised autonomous mode 444 can include determining when it is necessary to cede control of one or more of the essential vehicle control functions 220 for operation by the system user 212.

The fully autonomous state 230 can provide all safety-critical driving functions and monitors roadway conditions for an entire trip. The fully autonomous mode 446 can permit autonomous operation of occupied and unoccupied vehicles since safe operation of the user vehicle 208 rests solely on the autonomous vehicle operation system 230. For example, in the fully autonomous mode 446, the system user 212 can provide destination or navigation input, but is not expected to be available for control of the essential vehicle control functions 220 at any time during the trip.

The vehicle operation module 410 can identify the route obstacles 232 with the obstacle detection module 412. For example, the obstacle detection module 412 can identify the route obstacle 232 form the sensor information 422 indicating the presence of obstacles in the travel path 226 of FIG. 2 of the user vehicle 208, presence of children or animals, potholes, vehicles that are swerving between lanes of traffic, construction signs or vehicles, or changes in weather.

The obstacle analysis module 414 is for generating the obstacle handling assessment 234 for the route obstacle 232 encountered in the travel environment 224. More specifically, the obstacle analysis module 414 is for determining whether a change in the mode of operation of the user vehicle 208 is necessary. As an example, the obstacle analysis module 414 can generate the obstacle handling assessment 234 according to different categories. As a specific example, the obstacle handling assessment 234 can be divided into three general categories: the no-handover assessment 450, a standby assessment 452, and handover required assessment 454. The no-handover assessment 450 indicates that the autonomous vehicle operation system 230 is capable of navigating beyond the route obstacle 232 without a change in the autonomous operation modes 218.

The standby assessment 452 indicates a possibility that a change in the current instance of the autonomous operation modes 218 is required. For example, the standby assessment 452 can indicate that the system user 212 should be ready to assume one or more of the essential vehicle control functions 220 from the autonomous vehicle operation system 230.

The handover required assessment 454 indicates that the autonomous vehicle operation system 230 is unable to navigate beyond the route obstacle in the autonomous operation modes 218. For example, the handover required assessment 454 can indicate that the autonomous vehicle operation system 230 must disengage from the autonomous operation modes 218 and relinquish control of one or more of the essential vehicle operation functions 220 to the system user 212.

In an implementation of the obstacle analysis module 414, the obstacle handling assessment 234 can be generated based on a condition matrix 456. The condition matrix 456 is a reference to determine whether the autonomous vehicle operation system 230 is capable of navigation beyond the route obstacle 232 in the autonomous operation modes 218. As an example, the condition matrix 456 can include condition scenarios 458 with corresponding instances of the obstacle handling assessment 234.

The condition scenarios 458 are possible situations that the can be encounter while operating the user vehicle 208 in the travel environment 224. For example, the condition scenarios 458 can include condition categories, such as traffic scenarios, weather situations, road conditions, events, and construction events. The condition scenarios 458 can be one or a combination of multiple condition categories, such as a combination of traffic conditions and weather.

Each of the condition scenarios 458 in the condition matrix 442 can correspond to an instance of the obstacle handling assessment 234. For example, the condition scenarios 458 that the autonomous vehicle operation system 230 can navigate through or beyond during autonomous operation of the user vehicle 208 without possible intervention or takeover by the system user 212 can correspond to the no-handover assessment 450. As another example, for the condition scenarios 458 that the autonomous vehicle operation system 230 can navigate through or beyond during autonomous operation of the user vehicle 208 with a possibility of intervention or takeover by the system user 212 can correspond to the standby assessment 452. As a further example, for the condition scenarios 458 that the autonomous vehicle operation system 230 is unable to navigate through or beyond during autonomous operation of the user vehicle 208 with a possibility of intervention or takeover by the system user 212 can correspond to the handover required assessment 454.

In an implementation of the obstacle analysis module 414, the obstacle handling assessment 234 can be generated by comparing the route obstacle 232 with the condition scenarios 458 in the condition matrix 456. For example, the obstacle analysis module 414 can search the condition matrix 442 for a set of conditions or scenario that matches the route obstacle 232 and generate the obstacle handling assessment 234 as the instance of the obstacle handling assessment 234 corresponding to the condition scenarios 458.

The control flow can pass from the obstacle analysis module 414 to the alert generation module 416. The alert generation module 416 is for generating the obstacle orientation alert 236 for the system user 212. In general, for the obstacle handling assessment 234 of the standby assessment 452, a minimal amount of information can be presented in the obstacle orientation alert 236 while more information and time may be needed for the obstacle orientation alert 236 corresponding to the obstacle handling assessment 234 of the handover required assessment. The alert generation module 416 can generate the obstacle orientation alert 236 based on the engagement state 240 of the system user 212.

The navigation system 100 can determine the engagement state 240 with a user state evaluation module 480. The user state evaluation module 480 is for determining the engagement state 240 of the system user 212. The user state evaluation module 480 can determine the engagement state 240 based on user state information 448, user context information 490, or a combination thereof.

The user state information 448 is information about the physical state of the system user 212. For example, the user state information 448 can be the quantitative observation information about the system user 212, such as can be biometric information, including breathing rate, heart rate, pupil dilation, blink rate, brain waves, or a combination thereof. As another example, the user state information can include information about the movement and positioning of the system user 212, such as body posture, head angle, where the system user is looking, hand position, foot position, or a combination thereof.

The user context information 490 is information about the behavior, actions, and activities of the system user 212. For example, the user context information 490 can include activities that the system user 212 is currently engaged in, such as speaking on the phone, watching a movie, reading a book, or sleeping. The user state evaluation module 480 can, for example, determine the user state information 448, the user context information 490, or a combination thereof based on sensors, monitors, cameras, microphone, or other instruments.

In an implementation, the user state evaluation module 480, the user state information 448, the user context information 490, or a combination thereof can be used to determine a classification of the engagement state 240 of the system user 212. As an example, the engagement state 240 can include classifications of a handover ready state 482, a distracted state 484; a disengaged state 486, or a combination thereof. For illustrative purposes, the engagement state 240 is described including three states, however, it is understood that the engagement state 240 can be described differently. For example, the engagement state 240 can include additional classifications that can further divide the handover ready state 482, the distracted state 484, the disengaged state 486, or a combination thereof.

The handover ready state 482 is a state that indicates that the system user 212 is prepared to assume manual control of the user vehicle 208. For example, of the handover ready state 482 can be indicated by the system user 212 actively monitoring the operation of the autonomous vehicle operation system 230, the travel environment 224, the travel path 226, or a combination thereof. As another example, the handover ready state 482 can be indicated by the user state information 448, such as body position including hands on the steering wheel and feet on the accelerator or brake pedals.

The distracted state 484 is a state that indicates that the system user 212 is not immediately prepared to assume manual control of the user vehicle 208 and is partially focused on the environment around and operation of the user vehicle 208. For example the distracted state 484 can occur when the attention of the system user 212 is divided between monitoring the operation of the user vehicle 208 and another activity or when the system user 212 looks away from the travel environment 224 for a brief period of time, such as looking at a mobile device. As a specific example, inattention to the activities related to operation of the user vehicle 208 in the distracted state 484 can be measured on a time scale of seconds to up to a minute. In general, the distracted state 484 entails providing information about the travel environment 224, the route obstacle 232, the operation of the user vehicle 208, or a combination thereof before the system user 212 is prepared to assume the manual operation mode 216.

The disengaged state 486 is a state that indicates that the system user 212 is primarily engaged in an activity other than operation of the user vehicle 208 with little or no awareness of the environment around and operation of the user vehicle 208. For example, the disengaged state 486 can occur when the attention of the system user 212 is directed away from operation of the user vehicle 208, the travel environment, or a combination thereof for extended period of time, such as when watching a movie, reading a book, or sleeping. As a specific example, inattention to the activities related to operation of the user vehicle 208 in the disengaged state 486 can be measured on a time scale of a minute or more. In general, the disengaged state 486 entails providing more information about the travel environment 224, the route obstacle 232, the operation of the user vehicle 208, or a combination thereof than in the distracted state 484 before the system user 212 is prepared to assume the manual operation mode 216.

The user state evaluation module 480 can determine the engagement state 240, including the handover ready state 482, the distracted state 484, the disengaged state 486, based on the user state information 448, the user context information 490, or a combination thereof in a number of ways. In one example, the user state evaluation module 480 can directly use the user state information 448, the user context information 490, or a combination there of, to determine the engagement state 240. As a specific example, the user state information 448 indicating that the hand position the system user 212 on the steering wheel and eye gaze scanning the travel path 226 can be determined as standby handover ready state 482. In another example, the user state evaluation module 480 can implement a pattern recognition algorithm to correlate or match the user state information 448, the user context information 490, or a combination thereof to a behavior of the system user 212, such as combination of body posture, breathing rate, and blinking rate to indicate that the system user 212 is sleeping or about to fall asleep.

Returning to the alert generation module 416, the obstacle orientation alert 236 can be generated by the alert generation module 416 to account for the engagement state 240 of the system user 212. For example, the alert generation module 416 can generate the obstacle orientation alert 236 as a combination of the obstacle handling assessment 234 and the engagement state 240.

In an implementation of the navigation system 100, the obstacle orientation alert 236 can be generation primarily based on the engagement state 240 of the system user 212. As an example, for a given type of the obstacle handling assessment 234, the alert generation module 416 can tailor alert components 470 of obstacle orientation alert 236 to improve orientation of the system user 212 to the route obstacle 232 depending on the engagement state 240 of the system user 212. The alert components 470 are the modes and information for orienting the system user 212. For example the alert components 470 can include alert presentation modes 472, an alert content 474, an alert timing 476, or a combination thereof.

The alert presentation modes 472 are how the obstacle orientation alert 236 is presented. For example, the alert presentation mode 472 can include the audio components, the visual components, the haptic components, or a combination thereof for presenting the obstacle orientation alert 236.

The alert content 474 is the information that forms the content of the obstacle orientation alert 236. For example, the alert content 474 can be information about the type of the route obstacle 232, the relative location of the route obstacle 232, information about travel environment 224, or other information that can assist the system user 212 regarding the route obstacle 232. The alert content 474 can include how the information is ordered in the obstacle orientation alert 236 and the amount of detail included obstacle orientation alert 236.

The alert timing 476 are the temporal factors for presenting the obstacle orientation alert 236. For example, the alert timing 476 can include the duration of the obstacle orientation alert 236, how far in advance of reaching the route obstacle 232 or when the obstacle orientation alert 236 is presented to the system user 212.

In an example for the obstacle handling assessment 234 of the standby assessment 452, the alert generation module 416 can generate the obstacle orientation alert 236 by adjusting the alert components 470 differently for each instance of the engagement state 240. In a specific example for the engagement state 240 of the handover ready state 482, the amount of information in the obstacle orientation alert 236 can be minimal relative to the distracted state 484 and the disengaged state 486. In a specific example for the engagement state 240 of the distracted state 484, the alert generation module 416 can generate the obstacle orientation alert 236 to include information that states the existence of the route obstacle 232 through one of the alert components 470. In a specific example for the engagement state 240 of the disengaged state 486, the alert generation module 416 can generate the obstacle orientation alert 236 to get the attention of the system user 212 and can include information that states the location and time to reach the route obstacle 232 through multiple instances of the alert components 470.

In an example for the obstacle handling assessment 234 of the handover required assessment 454, the alert generation module 416 can provide more information through the alert components 470 relative to the standby assessment 452 when generating the obstacle orientation alert 236. In a specific example for the engagement state 240 of the handover ready state 482, the alert generation module 416 can generate the obstacle orientation alert 236 to include information that directs the attention of the system user 212 to the route obstacle 232. In a specific example for the engagement state 240 of the distracted state 484, the alert generation module 416 can generate the obstacle orientation alert 236 that informs the system user 212 of impending handover of the essential vehicle control functions 220 to the system user 212 and can include information about the type of the route obstacle 232, the location of the route obstacle 232, and time to reach the route obstacle 232 through multiple instances of the alert components 470. In a specific example for the engagement state 240 of the disengaged state 486, the alert generation module 416 can generate the obstacle orientation alert 236 to include information about the current operation state of the user vehicle 208 and the travel environment 224 in addition to impending handover of the essential vehicle control functions 220 to the system user 212, information about the type of the route obstacle 232, the location of the route obstacle 232, and time to reach the route obstacle 232.

The navigation system 100 can present the obstacle orientation alert 236 to the system user 212 through the first user interface 318 of FIG. 2 of the first device 102. For example, based on the alert components 470, the navigation system 100 can communicate the obstacle orientation alert 236 through audio cues, visual cues, haptic cues, or a combination thereof. As a specific example, the obstacle orientation alert 236 can be display through visual orientation with an icon or augmented reality depictions indicating the location of an upcoming instance of the route obstacle 232 on a display interface or a heads up display. As another specific example, the obstacle orientation alert 236 can be an audio alert that explains or describes the location and other details about the upcoming instance of the route obstacle 232.

It has been discovered that the navigation system 100 provides improved operation safety of the user vehicle 208. Providing the obstacle orientation alert 236 based on the engagement state 240 of the system user 212 improves the awareness of the travel environment 224 around the user vehicle 208 when the possibility of changing the instance of the vehicle operation modes 214 from the instance of the autonomous operation modes 218 to the manual operation mode 216 exists, which improves the safety and reliability in operating the user vehicle 208.

The navigation system 100 has been described with module functions or order as an example. The navigation system 100 can partition the modules differently or order the modules differently. For example, the obstacle detection module 412 can be coupled to the alert generation module 416.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

The physical transformation from generating the obstacle orientation alert 236 based on the engagement state 240 of the system user 212 results in the movement in the physical world, such as movement of the system user 212 in preparation to assume manual control of user vehicle 208. Movement in the physical world, such as the system user 212 engaging the manual operation mode 216 of the user vehicle 208, in turn results in changes to the autonomous vehicle operation system 230 by deactivating the autonomous operation of the user vehicle 208.

Figure 5:
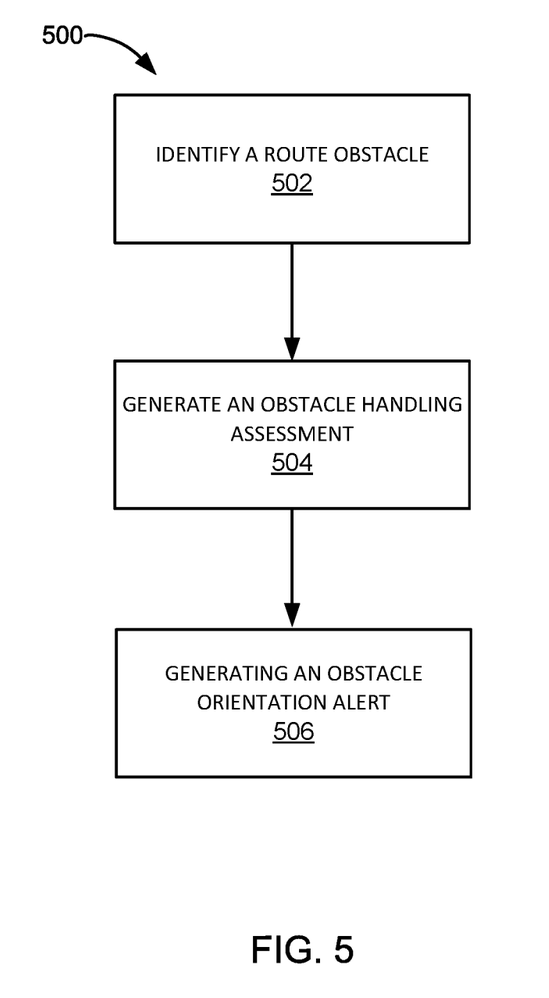
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: identifying a route obstacle in a travel environment of a user vehicle during operation of the user vehicle in an autonomous operation mode in a block 502; generating an obstacle handling assessment of whether the user vehicle is capable of navigation beyond the route obstacle in the autonomous operation mode in a block 504; and generating an obstacle orientation alert based on the obstacle handling assessment and an engagement state of a system user of the user vehicle in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
   a control unit configured to:
      identify a route obstacle in a travel environment of a user vehicle during operation of the user vehicle in an autonomous operation mode including identifying a distance to reach the route obstacle identified by detecting traffic scenarios, weather situations, road conditions, events, and construction;
      generate an obstacle handling assessment during the autonomous operation mode of whether the user vehicle is capable of navigation beyond the route obstacle or whether an autonomous vehicle operation system to relinquish controls of one or more of essential vehicle control functions to a system user, including the distance to the route obstacle, to navigate beyond the route obstacle;
      generate an obstacle orientation alert based on the obstacle handling assessment;
   a user interface, coupled to the control unit, configured to present the obstacle orientation alert.

2. The system as claimed in claim 1 wherein the control unit is configured to generate the obstacle orientation alert including an alert presentation mode, an alert content, an alert timing, or a combination thereof.

3. The system as claimed in claim 1 wherein the control unit is configured to generate the obstacle handling assessment as a no-handover assessment, a standby assessment, or a handover required assessment.

4. The system as claimed in claim 1 wherein the control unit is configured to determine an engagement state based on user state information.

5. The system as claimed in claim 1 wherein the control unit is configured to determine an engagement state based on user context information.

6. The system as claimed in claim 1 wherein the control unit is configured to generate the obstacle handling assessment based on a condition matrix.

7. The system as claimed in claim 1 wherein the control unit is configured to provide autonomous operation modes including a function-specific autonomous mode, a combined function autonomous mode, a supervised autonomous mode, a fully autonomous mode, or a combination thereof.

8. A method of operation of a navigation system comprising:
   identifying a route obstacle in a travel environment of a user vehicle during operation of the user vehicle in an autonomous operation mode including identifying a distance to reach the route obstacle identified by detecting traffic scenarios, weather situations, road conditions, events, and construction;
   generating an obstacle handling assessment during the autonomous operation mode of whether the user vehicle is capable of navigation beyond the route obstacle in the autonomous operation mode or whether an autonomous vehicle operation system to relinquish controls of one or more of essential vehicle control functions to a system user, including the distance to the route obstacle, to navigate beyond the route obstacle; and
   generating an obstacle orientation alert based on the obstacle handling assessment.

9. The method as claimed in claim 8 wherein generating the obstacle orientation alert includes generating the obstacle orientation alert including an alert presentation mode, an alert content, an alert timing, or a combination thereof.

10. The method as claimed in claim 8 wherein generating the obstacle handling assessment includes generating the obstacle handling assessment as a no-handover assessment, a standby assessment, or a handover required assessment.

11. The method as claimed in claim 8 wherein determine the engagement state includes determining an engagement state based on user state information.

12. The method as claimed in claim 8 wherein determining the engagement state includes determining an engagement state based on user context information.

13. The method as claimed in claim 8 wherein generating the obstacle handling assessment includes generating the obstacle handling assessment based on a condition matrix.

14. The method as claimed in claim 8 further comprises providing autonomous operation modes including a function-specific autonomous mode, a combined function autonomous mode, a supervised autonomous mode, a fully autonomous mode, or a combination thereof.

15. A non-transitory computer readable medium including instructions executable by a control circuit for a navigation system, the instructions comprising:
   identifying a route obstacle in a travel environment of a user vehicle during operation of the user vehicle in an autonomous operation mode including identifying a distance to reach the route obstacle identified by detecting traffic scenarios, weather situations, road conditions, events, and construction;
   generating an obstacle handling assessment during the autonomous operation mode of whether the user vehicle is capable of navigation beyond the route obstacle or whether an autonomous vehicle operation system to relinquish controls of one or more of essential vehicle control functions to a system user, including the distance to the route obstacle, to navigate beyond the route obstacle; and
   generating an obstacle orientation alert based on the obstacle handling assessment.

16. The non-transitory computer readable medium as claimed in claim 15, further comprising generating the obstacle orientation alert includes generating the obstacle orientation alert including an alert presentation mode, an alert content, an alert timing, or a combination thereof.

17. The non-transitory computer readable medium as claimed in claim 15, generating the obstacle handling assessment includes generating the obstacle handling assessment as a no-handover assessment, a standby assessment, or a handover required assessment.

18. The non-transitory computer readable medium as claimed in claim 15, wherein determine an engagement state includes determining the engagement state based on user state information.

19. The non-transitory computer readable medium as claimed in claim 15, wherein determining an engagement state includes determining the engagement state based on user context information.

20. The non-transitory computer readable medium as claimed in claim 15, wherein generating the obstacle handling assessment includes generating the obstacle handling assessment based on a condition matrix.

\* \* \* \* \*